UNITED STATES PATENT OFFICE.

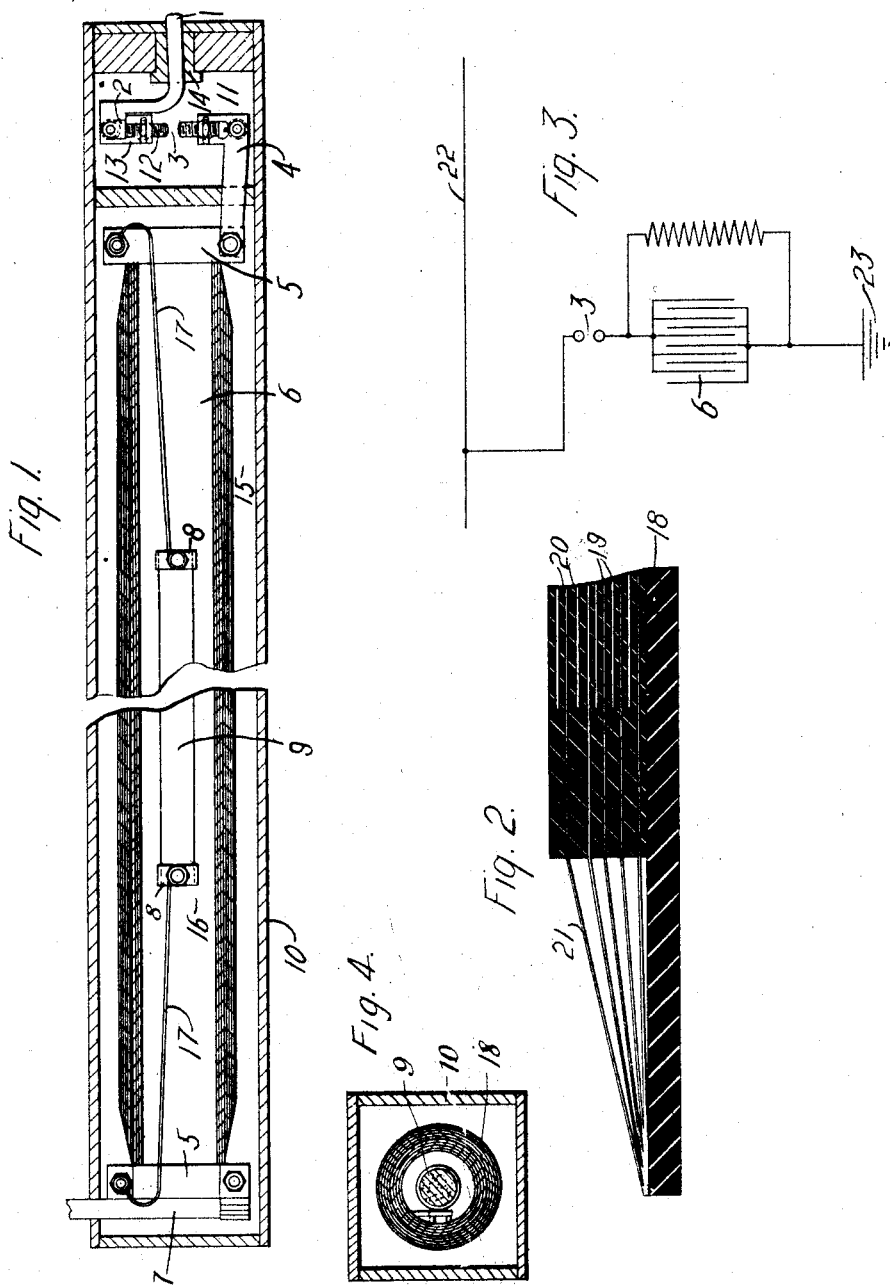

RAY P. JACKSON, OF EDGEWOOD, PENNSYLVANIA, ASSIGNOR TO WESTINGHOUSE ELECTRIC AND MANUFACTURING COMPANY, A CORPORATION OF PENNSYLVANIA.

LIGHTNING-ARRESTER.

1,194,195.  Specification of Letters Patent.  Patented Aug. 8, 1916.

Application filed October 31, 1913. Serial No. 798,514.

*To all whom it may concern:*

Be it known that I, RAY P. JACKSON, a citizen of the United States, and a resident of Edgewood, in the county of Allegheny and State of Pennsylvania, have invented a new and useful Improvement in Lightning-Arresters, of which the following is a specificaton.

My invention relates to protective devices, and it has particular reference to such devices as are adapted to protect electrical circuits and electrical apparatus from dangerous strains occasioned by the flow of high-frequency currents.

An electrical circuit and the apparatus associated therewith are subjected to disturbances arising from sudden variations of the electrical conditions of the circuit, static discharges occurring upon the transmission conductors and resonance effects between various parts of the installation. As a result of these disturbances, oscillatory currents of high frequency are generated which may cause dangerous strains to be imposed upon the equipment.

One object of my invention is to provide a protective device which affords an easy path to ground for high-potential and high-frequency currents flowing in an electrical circuit, thereby relieving the electrical apparatus inserted therein from dangerous strains and insuring the maintenance of a high degree of insulation.

Another object of my invention is to provide a device of the character above indicated which will reliably perform its required functions without the necessity of making frequent inspections and replacements.

For a better understanding of the nature, the scope and the characteristic features of my invention, reference may be had to the following description and the accompanying drawing, in which—

Figure 1 is a plan view of a lightning arrester constructed in accordance with my invention; Fig. 2 is a cross-sectional view of a portion of a condenser employed in my lightning arrester, Fig. 3 is a diagrammatic view showing a device embodying a form of my invention connected to a transmission conductor, and Fig. 4 is a cross sectional view of the device shown in Fig. 1.

Referring to Figs. 1 and 4, a conductor 1 is connected to one electrode member 2 of a spark gap 3, the other electrode member of which is connected, by means of a conductor 4, to a terminal 5 of an electrostatic condenser 6. To the other terminal 5 of the condenser is connected a conductor 7 which is connected to ground by means of a ground plate (not shown). Terminals 8 of a non-inductive resistance element 9 are connected to the condenser terminals 5, thereby placing the resistor 9 in parallelism with the condenser 6. For convenience, I prefer to mount my device within a containing box 10 provided with suitable covers (not shown) by means of which the device is protected against tampering when installed.

The spaced electrodes 2 forming the spark gap 3 are contained in a separate chamber 11 located in the upper portion of the box 10. Each of the electrodes 2 comprises a screw 12 threaded into an angularly shaped member 13, thereby providing means of adjustment for the length of the spark gap 3. The conductor 1 extends through a bushing 14 and connects one of the spark gap electrodes 2 to a conductor (not shown) of the electrical circuit which is afforded protection by my device.

Positioned within a second and separate chamber 15 is the condenser 6 and the resistor 9. As shown in Fig. 4, the condenser is constructed in the form of a hollow cylinder to facilitate the manufacture thereof and to provide an inner space 16 for the resistor 9. It is important that the resistor 9 be non-inductive to preclude the establishment of resonance between it and the condenser 6. For this reason I prefer that the resistor 9 be a rod of carborundum or a material similar thereto. The resistance rod 9 is longitudinally disposed within the space 16 and is provided with the terminals 8 which are connected, by means of conductors 17 to the condenser terminals 5. The conductor 7 extends through an opening in the wall of the box 10 and connects the lower terminal 5 of the condenser 6 to ground by any suitable and reliable means. To insure the condenser 6 and the resistor 9 from absorbing moisture which would destroy their electrical properties, a non-hygroscopic material or cement is molded in the chamber 15 and the space 16 to envelop entirely the aforesaid elements.

The condenser 6 shown in Fig. 2 is preferably constructed as set forth in Patent No.

858,385, granted July 2, 1907, to the Westinghouse Electric and Manufacturing Company as assignee of Emil Haefely. A main cylinder 18 is first formed to lend support to the structure. Sheets 19 of tin foil or other suitable conducting material are interposed at convenient or desired intervals between convolutions 20 of sheet insulating material during the construction of the condenser. Alternate layers of the tin foil 19 are connected together by means of conducting strips 21, one group of the tin foil layers forming the positive plates and the other forming the negative plates of the electrostatic condenser 6, substantially as shown in the drawing.

Referring to Fig. 3, the spark gap 3 is adjusted to prevent a working current of normal voltage from jumping across it and flowing from the line conductor 22 to the ground 23. When a high-frequency disturbance occurs upon the conductor 22, it will jump across the spark gap 3 and readily pass through the condenser 6 to the ground connection 23. Inasmuch as little impedance is offered to the flow of high-frequency currents through the condenser, little current will flow through the non-inductive resistance 9, which is connected at all times in parallel with the condenser 6, thereby assuring that it is maintained continually discharged and, therefore, in the most effective operative condition to permit an easy flow to ground for the high-frequency currents. The normal current flowing on the conductor 22, which current may be either direct or alternating, and of relatively low frequency, will be offered considerable impedance by the condenser 6 and the resistance 9 and, therefore, the line current will not readily flow to ground through my device. It is obvious that the resistance element 9 must be non-inductive to prevent the formation of resonance in the circuit comprising the condenser 6 and the resistor 9.

I claim as my invention:

1. A protective device comprising a tubular condenser composed of alternate layers of insulating and conducting material, a non-inductive resistance element disposed in the opening thereof, inclosed thereby, and connected in shunt relationship thereto, a pair of spaced electrodes to form an air gap, and means to connect one terminal of the condenser to one of said electrodes.

2. A protective device comprising a tubular condenser, a non-inductive resistance element disposed in the opening thereof, inclosed thereby, and connected to said condenser to maintain it normally in a discharged state, a pair of spaced electrodes to form an air gap, means to connect one terminal of the condenser to one of said electrodes, and means to connect the other terminal to ground.

3. A protective device comprising a condensive reactance element of tubular form and composed of alternate layers of insulating and conducting materials, a non-inductive resistance element disposed in the opening thereof and inclosed thereby, spaced electrodes to form an air gap, and means to connect corresponding terminals of the condensive and resistance elements to one of said electrodes and to ground.

4. A protective device comprising a condensive reactance element of tubular form and composed of alternate layers of conducting and insulating materials, a non-inductive resistance element inclosed by said condensive element and connected in parallel relationship therewith, adjustable spaced electrodes to form an air gap one of which is connected to the line conductor to be protected, and the other of which is connected to one terminal of said condensive reactance element, and means to connect the other terminal of the condensive reactance element to ground.

In testimony whereof, I have hereunto subscribed my name this 22nd day of Oct., 1913.

RAY P. JACKSON.

Witnesses:
GOLDIE E. MCGEE,
B. B. HINES.